United States Patent [19]

Bader

[11] 4,206,776
[45] Jun. 10, 1980

[54] GRAVITY-CONTROLLED FLOW VALVE

[75] Inventor: Eberhard Bader, Munich, Fed. Rep. of Germany

[73] Assignee: Motoren-und Turbinen-Union Müchen GmbH, Munich, Fed. Rep. of Germany

[21] Appl. No.: 954,635

[22] Filed: Oct. 25, 1978

[30] Foreign Application Priority Data

Oct. 29, 1977 [DE] Fed. Rep. of Germany ....... 2748692

[51] Int. Cl.² .............................................. F16K 17/36
[52] U.S. Cl. ................................................ 137/45
[58] Field of Search ............... 137/38, 39, 45; 244/80, 244/135 R

[56] References Cited

U.S. PATENT DOCUMENTS

| 1,393,825 | 10/1921 | Porharty | 137/45 X |
| 3,451,406 | 6/1969 | Cohn | 137/45 |
| 3,982,794 | 9/1976 | Colovas | 137/45 X |

FOREIGN PATENT DOCUMENTS 1245762 9/1971 United Kingdom ....................... 137/45

Primary Examiner—Robert G. Nilson
Attorney, Agent, or Firm—Scully, Scott, Murphy & Presser

[57] ABSTRACT

A gravity-controlled flow valve of the pendulum-type, having a valve body with two chambers which communicate through gaps formed in a separating wall between the chambers and an adjoining outer circumferential surface of a rotary slide valve. A pendulum is connected to the rotary slide valve for movement within the valve body whereby flow apertures in a sleeve-like member are either opened or closed by the rotary slide valve in cooperation with flow apertures in that valve.

5 Claims, 2 Drawing Figures

GRAVITY-CONTROLLED FLOW VALVE

BACKGROUND OF THE INVENTION

1. Field of the Invention

The present invention relates to a gravity-controlled flow valve, and particularly, a flow valve for aircraft.

2. Discussion of the Prior Art

Although gravity-controlled valves operating in an electrical, pneumatic and purely mechanical manner are presently known, these are, however, of complex construction and available in relatively large-sized dimensions. The difficulty seen herein lies in the compensation of the hydraulic forces produced during the flow through valves of that type.

Predicated on the relatively large hydraulic forces, these valves require relatively large electrical or pneumatic actuating forces or, in the case of purely mechanically actuated valves which operate pursuant to the pendulum principle, necessitate a relatively large and heavy pendulum.

SUMMARY OF THE INVENTION

Accordingly, it is a primary object of the present invention to provide a simple, and dependably operating flow valve having the smallest possible dimensions, which facilitates the gravity-controlled through flow of large quantities of liquid at high and low pressures.

It is a more specific object of the present invention to provide a valve incorporating the following essential characteristics:

(a) a gravity-controlled pendulum is arranged within a first chamber encompassed by the valve body so as to be movable between two limit stops on the valve body;

(b) the pendulum is fixedly connected to a rotary slide valve which is pivotally supported on a sleeve-like member fixedly connected to the valve body, the sleeve-like member being closed at one end thereof and open at the other end for the liquid infeed;

(c) within a second chamber of the valve which is screened off from the first chamber, the sleeve-like member evidences oppositely arranged flow apertures which are operatively associated with further flow apertures of the rotary slide valve so that, upon a movement of the pendulum from a first to a second end position, the flow apertures of the sleeve-like member are to the same extent increasingly closed or opened by means of the rotary slide valve;

(d) the second chamber includes at least one outlet aperture arranged in the valve body or in the valve cover for the introduced liquid.

As a result of the present invention there can thus be provided a mechanical valve operating on the pendulum principle, which is distinguished by its simplicity of design and thereby dependability, wherein the hydraulic forces can be almost completely compensated for by the described arrangement and configuration of the flow apertures and of the control slide valve.

Pursuant to a further advantageous embodiment of the present invention, the first chamber and the second chamber communicate with each other through gaps which are formed intermediate the inner ends of the partition wall between the two chambers and the presently adjoining outer circumferential surfaces of the rotary slide valve.

In order to control its speed of movement, the pendulum may be inventively provided with a throttle.

BRIEF DESCRIPTION OF THE DRAWINGS

Reference may now be had to a preferred embodiment of a gravity-controlled flow valve according to the invention, taken in conjunction with the accompanying drawings; in which.

DETAILED DESCRIPTION

Figure 2:
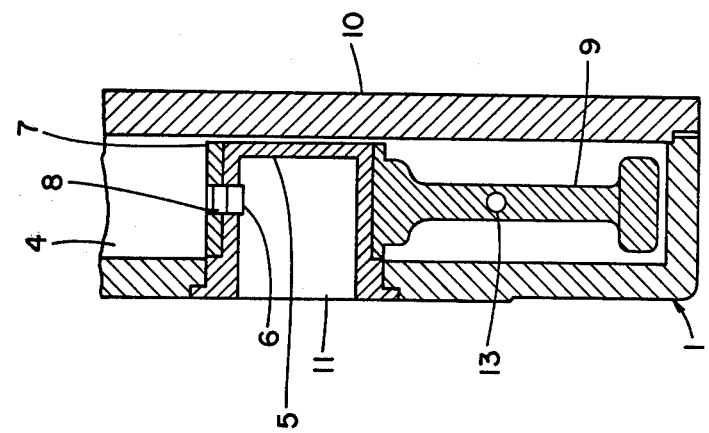
FIG. 2 is a sectional view taken along line II—II in FIG. 1.
Figure 1:
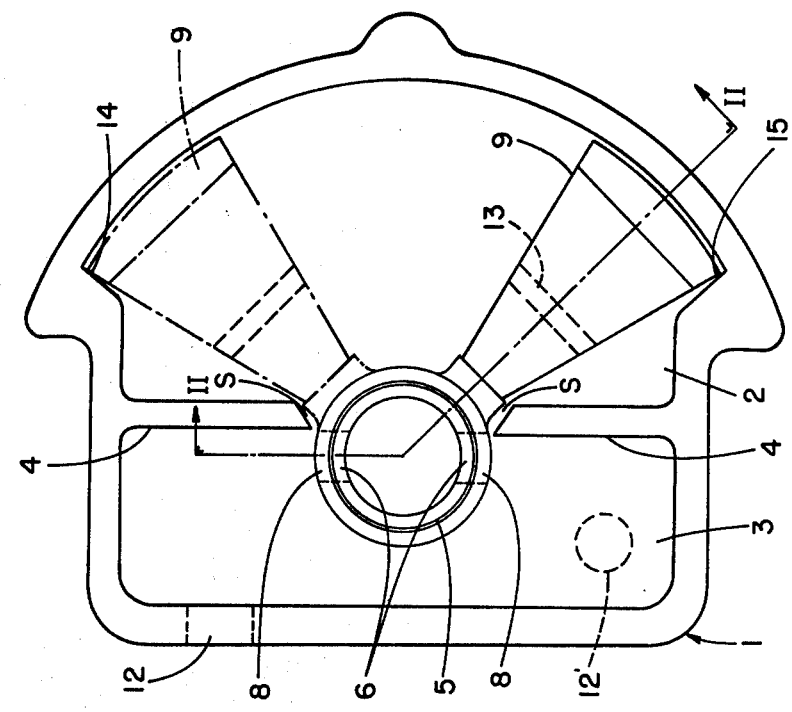
FIG. 1 is a side elevational view of the inventive flow valve with the valve cover having been removed.

The inventive flow valve consists of a valve body 1 having two chambers 2, 3, wherein the first chamber 2 is filled with liquid, however which does not flow since there is no absolute seal between the chambers 2 and 3 through the gaps, whereas the second chamber 3 is designated for the flowing liquid. The partition wall 4 between the two chambers 2, 3 can be either entirely or partly omitted when the flow conditions will not result in any or only extremely small hydraulic forces. Fixedly connected to the valve body 1 is a sleeve-like member 5 which is closed off at one end. The sleeve-like member 5 has laterally symmetrical flow apertures 6 formed therein in conformance with the desired control relationship. A rotary slide valve 7 is pivotally supported on the sleeve-like member 5 and is provided with further flow apertures 8 also correlated with the desired control relationship, and which is fixedly connected with a pendulum 9. A valve cover 10 is adapted to close the valve. The liquid flows through the open end of the sleeve-like member 5 into the cylindrical chamber 11 thereof and exits the latter through the flow apertures 6 and 8.

Arranged at a suitable location in the valve body 1 or in the valve cover 10 are outlet apertures 12, 12' by means of which the introduced liquid can egress. Through a throttle 13 formed in the leg of the pendulum there can be controlled the speed with which the pendulum 9 follows a change in the direction of gravity.

The valve body 1 is so constructed as to provide for the formation of two limit stops 14, 15 for the movement of the pendulum 9 from a first into a second end position, and reversely.

When the direction of gravity changes, the pendulum will follow, thereby displacing the rotary control slide valve 7 relative to the sleeve-like member 5, and causing the apertures 6 and 8 to assume different positions relative to each other, whereby collective flow cross-sections will concurrently become either larger or smaller.

Inasmuch as the first chamber, within which there moves the pendulum 9, is also filled with the liquid, through configuring of the pendulum 9 and/or the size of the throttle 13, the response relationship of the valve can be influenced, which may be desirable, for instance, in aircraft under turbulent air conditions.

The flow valve can be installed in the oil system of an aircraft jet engine, for example, to prevent excessive oil consumption encountered during inverted flight, which are required through a predetermined configuration of the bearing chamber, wherein the oil supply to the bearing chamber or chambers is either restricted or completely interrupted.

What is claimed is:

1. A gravity-controlled flow valve, particularly for aircraft, comprising in combination:

(a) a valve body having a first chamber formed therein; a gravity-controlled pendulum in said first chamber movable between two limit stops in said valve body;

(b) a rotary slide valve fixedly connected with said pendulum; a sleeve-like member rigidly fastened to said valve body, said rotary slide valve being pivotally supported on said sleeve-like member, said member having one end closed and the other end thereof open for infeed of liquid into the flow valve;

(c) a second chamber in said valve body screened off from said first chamber, said sleeve-like member including oppositely arranged flow apertures within said second chamber; and flow apertures in said rotary slide valve communicating with said first-mentioned flow apertures in a manner whereby upon movement of said pendulum from a first into second end position the flow apertures of said sleeve-like member are to the same extent increasingly closed or opened by said rotary slide valve; and (d) at least one outlet aperture being formed in communication with said second chamber for the egress of the introduced liquid.

2. A flow valve as claimed in claim 1, said outlet aperture from said second chamber being formed in said valve body.

3. A flow valve as claimed in claim 1, said valve body including a valve cover, said outlet aperture from said second chamber being formed in said valve cover.

4. A flow valve as claimed in claim 1, comprising a separating wall screening said first chamber from said second chamber; gaps communicating said first and second chambers for providing a pressure balance therebetween, said gaps being formed intermediate the inner ends of said separating wall between the two chambers and the presently adjoining outer circumferential surfaces of said rotary slide valve.

5. A flow valve as claimed in claim 1 or 2, comprising throttle means being formed in said pendulum.

* * * * *